Dec. 10, 1963 D. H. MASH 3,114,045

PHOTO-CONDUCTIVE TRANSLUCENT ELECTRO-LUMINESCENT DEVICE AND METHOD OF MANUFACTURE

Filed Aug. 14, 1957

INVENTOR
DEREK HUBERT MASH

BY Lawrence Burns
ATTORNEY

United States Patent Office 3,114,045
Patented Dec. 10, 1963

3,114,045

PHOTO-CONDUCTIVE TRANSLUCENT ELECTRO-LUMINESCENT DEVICE AND METHOD OF MANUFACTURE

Derek Hubert Mash, London, England, assignor to Thorn Electrical Industries Limited Filed Aug. 14, 1957, Ser. No. 678,240
Claims priority, application Great Britain Aug. 20, 1956
7 Claims. (Cl. 250—213)

Figure 1:
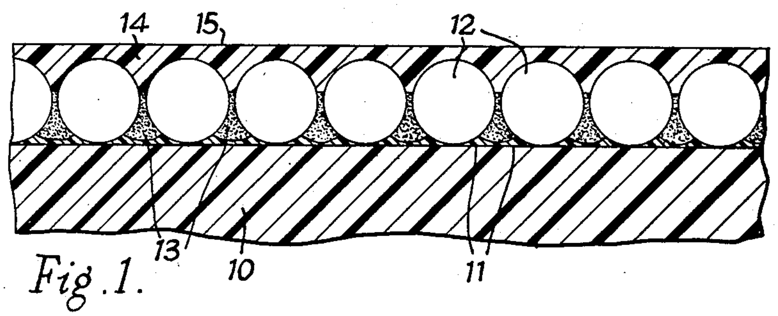

The present invention relates to the manufacture of translucent electrically-conducting layers. Such layers are required for many purposes; for example in electro-luminescent and photo-conductive devices.

Many methods of making such layers are known. For instance, there are a number of metal oxides that can be deposited on viteous surfaces at high temperature and give highly transparent conducting films. A typical process of this kind consists in subjecting glass while hot to the action of tin chloride. This process is only applicable to vitreous surfaces and temperatures of several hundred degrees centigrade are needed.

Conducting transparent films can also be formed on smooth continuous surfaces by vacuum evaporation or by the application of graphite.

The present invention has for its object to provide a novel method of forming a translucent, electrically-conducting layer upon a base, the method not being limited to application upon smooth continuous surfaces and not involving the subjection of the base to high temperatures.

According to the present invention a method of forming a translucent electrically-conducting layer upon a base comprises the steps of applying to a surface of the base a thin layer of small glass beads, and subsequently applying an electrically-conducting paint or powder to form a conducting network around the beads. The beads are what are known as "ballotini" and are preferably applied in a layer one bead thick. The ballotini may have a diameter between about 0.05 and 0.5 mm. It is found that much of the incident light is capable of passing through the ballotini and that, therefore, the layer is translucent, even if the conducting network is opaque.

If it is desired that the layer should be conductive over the ballotini as well as over the spaces between them, the surfaces of the ballotini may be rendered electrically conducting before they are applied to the base. This may be done for example, by treating the ballotini when hot with tin chloride, or by rolling them in a mill with a small quantity of graphite powder for a few hours, when the surfaces take up a thin polished layer of graphite which is electrically conducting and transmits light.

The ballotini may be attached to the surface of the base by many methods. One method that has been found satisfactory is to flood the surface with a dilute solution of a plastic which remains tacky when the solvents have evaporated. The ballotini may then be rolled or shaken on to the surface when they attach themselves in a closely-spaced arrangement.

The conducting material to form the network or mesh may, for example, be a suspension of silver in toluene, or a conducting powder such as silver or graphite. This may be applied by means of a brush or otherwise. If silver powder is used, the resulting network may have a very low electrical resistance, while remaining translucent.

If desired a layer of a suitable transparent or translucent plastic may be applied over the ballotini after the conducting network has been applied. In this way both scatter and absorption of light may be reduced and layers can be produced with a light transmission of 60% or more.

Figure 2:
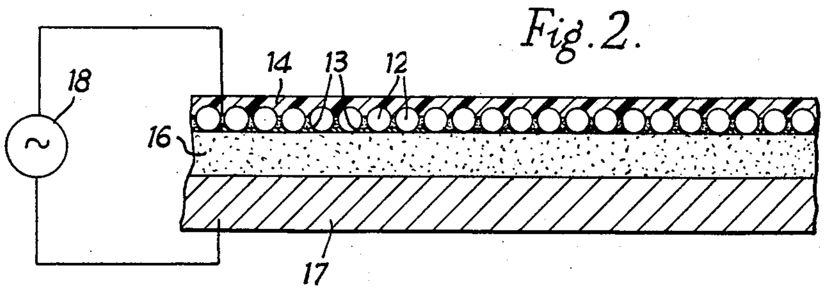
Figure 3:
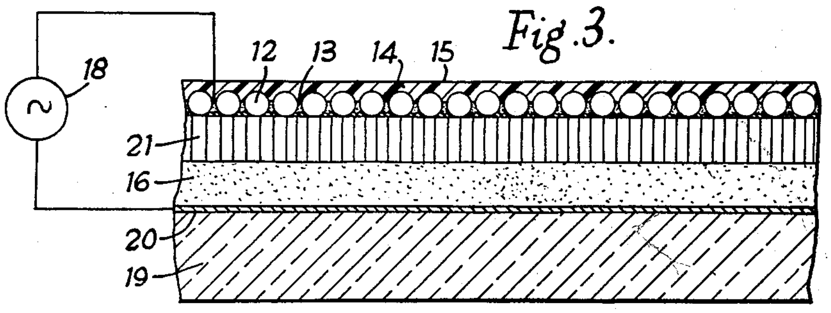

The invention will be described, by way of example, with reference to the accompanying drawing in which FIG. 1 is a much enlarged view in cross-section of a translucent electrically-conducting sheet made in accordance with the present invention, FIG. 2 is an enlarged view in cross-section of an electro-luminescent cell according to the invention, and FIG. 3 is an enlarged view in cross-section of a simple light amplifier according to the invention.

Referring to FIG. 1, a plastic base 10 has its upper surface flooded with a dilute solution of a plastic 11 which remains tacky when the solvents have evaporated. One example of a suitable solution is

| | | |
|---|---|---|
| Beetle resin BA502 | gms | 100 |
| Xylene | ccs | 100 |
| Butyl alcohol | ccs | 25 |

Beetle resins are made by British Industrial Plastics Limited, and BA502 is a solution of an alkyd resin.

When the solvent has evaporated, ballotini 12 are rolled or shaken on to the tacky surface where they attach themselves in a closely-packed arrangement.

A suspension of silver in toluene, or a conducting powder such as silver or graphite, is then applied by means of a brush or otherwise and a conducting mesh 13 is thus formed around the ballotini. The conducting coating material 13 does not usually show any tendency to cling to the surfaces of the ballotini, but any that does cling may easily be wiped off. A layer 14 of a transparent or translucent plastic is then applied by spraying, by means of a brush, or otherwise over the ballotini to form a smooth outer surface 15.

The measurement of the resistance of a conducting layer is usually effected between two parallel conducting strips in contact with the layer. This method can in some cases give misleading results, because the layer may consist of a large number of electrically isolated elements with a few conducting paths extending between the conducting strips and formed by elements that, by chance, are in contact with one another. In such cases the resistance measured may be reasonably low but for many purposes such a layer is unsuitable.

One application of the invention is to an electro-luminescent lamp whose performance gives a definite indication of the quality of the conducting layer. Thus a conducting network formed according to the invention may be provided as one electrode of such a lamp, the other electrode being either an opaque conducting layer or a further layer provided in accordance with the invention.

Thus as shown in FIG. 2, ballotini 12 are attached as described with reference to FIG. 1 to a layer 16 of electro-luminescent material carried on a metal plate 17, the layer 16 replacing the plastic layer 10 of FIG. 1. The conducting mesh 13 is connected to one terminal of a source 18 of alternating current and the other terminal of the source is connected to the plate 17.

When a suitable voltage is applied between the electrodes 13 and 17, light is found to be emitted uniformly over the whole surface covered by the electrodes, thereby demonstrating that the conductivity is uniform. Moreover using ballotini of 0.06 mm. diameter, it is not possible to detect the pattern of the network in the distribution of emitted light. In this case it has been found unnecessary to render the surfaces of the ballotini conducting.

The invention is of special value in providing translucent conducting coatings on the surfaces of plastics, which has hitherto not been possible economically. Such a plastic body is of value in electro-luminescent lamps for example.

Another use for the invention is in rendering electrically conducting the surface of the photo-conductor in a light amplifier while providing sufficient transparency to allow incident light to activate the photo-conductor.

An example is shown in FIG. 3 where there is shown a glass base 19 having its upper surface provided with a transparent electrically-conducting layer 20 of tin oxide. Over the layer 20 is a layer 16 of electro-luminescent material covered with a layer 21 of photo-conductive material. The ballotini 12, mesh 13, and outer coating 14 are applied over the layer 21 as described with reference to FIG. 1. A source 18 of alternating current may be connected between the mesh 13 and the layer 20.

When an image is formed on the surface 15, an image of greater light intensity is visible through the glass base 19.

I claim:

1. A method of forming a translucent electrically-conducting layer upon a base comprising the steps of applying to a surface of the base a thin layer of small glass beads, and subsequently applying electrically-conducting material to form a conducting network around the beads.

2. A method according to claim 1 comprising the step of rendering the surfaces of the beads electrically conducting before the beads are applied to the base.

3. A method according to claim 1, wherein the electrically conducting network is of a conducting powder which does not form an insulating surface layer when exposed to the atmosphere.

4. A method according to claim 1, wherein the electrically conducting network is of silver.

5. A method according to claim 1, comprising the further and subsequent step of applying a layer of translucent or transparent material over the beads to provide a smooth surface.

6. An electro-luminescent device comprising a first layer of electro-luminescent material, an electrically-conducting layer on one side of said first layer, and on the opposite side of said first layer a translucent layer comprising a thin layer of small glass beads attached to said first layer and electrically-conducting material forming a network surrounding said beads.

7. The device of claim 6 in which there is a photo-conductive layer between the electroluminescent layer and the translucent layer.

References Cited in the file of this patent

UNITED STATES PATENTS

| | | |
|---|---|---|
| 2,495,697 | Chilowsky | Jan. 31, 1950 |
| 2,773,992 | Ullery | Dec. 11, 1956 |